(12) United States Patent
Wilkins et al.

(10) Patent No.: US 6,808,548 B2
(45) Date of Patent: Oct. 26, 2004

(54) THREE COMPONENT FILTRATION MATERIAL

(75) Inventors: Rodney R. Wilkins, Granville, OH (US); K. Dale Montgomery, Garner, NC (US); Stephen W. Alexander, Basking Ridge, NJ (US); James G. Tuttle, Newburgh, NY (US); Edwin G. Hoel, Inverness, IL (US)

(73) Assignee: Hollinee Glass Corporation, Shawnee, OH (US)

( * ) Notice: Subject to any disclaimer, the term of this patent is extended or adjusted under 35 U.S.C. 154(b) by 0 days.

(21) Appl. No.: 10/334,881

(22) Filed: Dec. 31, 2002

(65) Prior Publication Data

US 2004/0123574 A1 Jul. 1, 2004

(51) Int. Cl.[7] .............................................. B01D 39/16
(52) U.S. Cl. ....................... 55/528; 55/DIG. 39; 96/68; 442/5; 442/415
(58) Field of Search .................... 55/527, 528, DIG. 39; 96/68; 442/5, 50, 181, 301, 304, 325, 414, 415; 428/98

(56) References Cited

U.S. PATENT DOCUMENTS

| | | | |
|---|---|---|---|
| 4,765,812 A | * 8/1988 | Homonoff et al. ............. 55/528 |
| 4,798,850 A | 1/1989 | Brown | |
| 5,198,293 A | * 3/1993 | Metrick ....................... 442/151 |
| 5,470,485 A | 11/1995 | Morweiser et al. | |
| 5,685,897 A | * 11/1997 | Belding et al. ................ 55/528 |
| 5,792,242 A | 8/1998 | Haskett | |
| 6,328,788 B1 | 12/2001 | Auger | |
| 6,419,729 B1 | * 7/2002 | Duffy et al. .................... 96/68 |
| 2002/0041841 A1 | * 4/2002 | Horaguchi et al. ....... 428/299.7 |
| 2002/0092634 A1 | * 7/2002 | Rokman et al. ............ 442/181 |

* cited by examiner

Primary Examiner—Duane Smith
Assistant Examiner—Jason M. Greene
(74) Attorney, Agent, or Firm—Jason H. Foster; Kremblas, Foster, Phillips & Pollick

(57) ABSTRACT

A filter material comprising a blend of at least three types of fibers: (a) polypropylene fibers (b) polymethaphenylene isophtalamide fibers and (c) fibers of a third type selected from the group of acrylic and modacrylic. In a preferred embodiment, the blend contains about ten weight percent polymethaphenylene isophtalamide fibers, about 50 weight percent polypropylene fibers and about 40 weight percent modacrylic fibers. Performance of the blend is superior to the prior art filtration materials, especially at the preferred compositions.

13 Claims, 1 Drawing Sheet

| Sample | Penetration (% in 15 min.) | Percent Nomex | Percent Asota PP | Percent Std. PP | Percent Modacrylic | Percent Acrylic |
|---|---|---|---|---|---|---|
| g | 1.89 | 10 | 50 | - | 40 | - |
| h | 3.07 | 20 | 50 | - | 30 | - |
| i | 3.56 | 30 | 50 | - | 20 | - |
| d | 3.78 | 20 | 30 | - | 50 | - |
| l | 4.40 | 20 | 50 | - | - | 30 |
| r | 6.05 | 40 | 60 | - | - | - |
| j | 6.08 | 40 | 50 | - | 10 | - |
| k | 6.89 | 20 | 30 | - | - | 50 |
| a | 8.30 | - | - | 50 | 50 | - |
| m | 8.30 | 30 | 20 | - | - | 50 |
| q | 8.39 | 30 | 70 | - | - | - |
| c | 8.56 | 10 | 40 | - | 50 | - |
| p | 9.38 | 20 | 80 | - | - | - |
| e | 10.67 | 30 | 20 | - | 50 | - |
| b | 15.35 | - | - | 50 | - | 50 |
| o | 15.55 | 10 | 90 | - | - | - |
| n | 23.07 | 30 | 50 | - | - | 20 |
| f | 35.10 | 40 | 10 | - | 50 | - |

Fig.1

THREE COMPONENT FILTRATION MATERIAL

BACKGROUND OF THE INVENTION

1. Field of the Invention

This invention relates generally to a filtration material, and more particularly to a filtration material holding an electrostatic charge and comprising three types of fibers blended together.

2. Description of the Related Art

It is known in the filtration art that various kinds of fibers can be formed into a web or other structure having tortuous paths between the fibers through which a gas stream, such as air, is passed to remove particulate matter from the gas stream. The particulate matter in the gas flowing through the paths in the web is retained on the upstream side of the web, or within the tortuous paths of the web due to the size of the particles relative to the paths' diameters.

Furthermore, it is known to charge various blends of fibers electrostatically to further retain particulate matter through electrostatic attraction between the fibers and the particles. Such blends and other filtration improvements are shown in U.S. Pat. No. 6,328,788 to Auger, U.S. Pat. No. 4,798,850 to Brown, U.S. Pat. No. 5,470,485 to Morweiser, et al., and U.S. Pat. No. 5,792,242 to Haskett, all of which are incorporated herein by reference.

The Auger patent discloses a blend of two types of fibers: polypropylene and polymetaphenylene isophthalamide, such as, for example, is sold under the trademark NOMEX. The preferred ranges of weight ratios polymetaphenylene isophthalamide to polypropylene) is between 5:95 and 50:50 and more preferably between 10:90 and 30:70.

The Brown patent discloses a blend of two types of fibers: polyolefin and a substituted additional polymer. The first fiber in Brown is preferably polypropylene and the second is modacrylic. The preferred range of surface area ratios (polypropylene to modacrylic) in Brown is 30:70 to 80:20, and more preferably 40:60 to 70:30.

The prior art filtration materials provide sufficient filtration for many environments. However, where the electrostatic charge must be retained for long periods or where the penetration through the filtration material must be below a particular percentage, the prior art does not suffice. Therefore, the need exists for a filtration material that provides the needed performance at a feasible cost to manufacture.

BRIEF SUMMARY OF THE INVENTION

It has been discovered that a combination of three fibers can be blended to form a filtration material that has superior performance to the filtration materials of the prior art. The three fiber types include polypropylene, polymetaphenylene isophthalamide, and a third type selected from the group of modacrylic and acrylic. In a preferred embodiment, the amount of polymetaphenylene isophthalamide is between about 5 and 20 percent, and the balance is divided between polypropylene and modacrylic. In another embodiment, the polymetaphenylene isophthalamide content is between about 5 and 20 percent, and the balance is divided between polypropylene and acrylic.

BRIEF DESCRIPTION OF THE SEVERAL VIEWS OF THE DRAWINGS

FIG. 1 is a table of experimental data for samples embodying the invention at various fiber compositions.

In describing the preferred embodiment of the invention, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

As described above, the present invention comprises a blend of at least three types of fibers: (a) polymetaphenylene isophthalamide, (b) polypropylene and (c) a third type of fiber made of either acrylic or modacrylic. The fibers are preferably manufactured and then blended together in a conventional process to obtain a product having consistent fiber composition throughout an entire web of the filtration material.

polymetaphenylene isophthalamide is sold by E.I. du Pont de Nemours and Company under the trademark NOMEX, and Teijin Limited under the trademark TEIJINCONEX. The polymetaphenylene isophthalamide fibers used in experimental testing were NOMEX brand fibers, 2.0 denier by 2 inches long. The fiber was cleaned of finish by washing in a solution of approximately 4% sodium carbonate by weight in water. The fibers were then rinsed and dried.

The polypropylene fibers are preferably relatively clean, meaning there are only small amounts of antistatic and/or lubricant agent on them. This amount is, for example, on the order of 0.02 percent by weight. The fibers can be cleaned to remove most of the agents, or they can be formed in a process that leaves little or no such agents. The preferred polypropylene fibers are sold by Asota Ges.m.b.H. of Austria. The fibers used in the tests were 2.25 denier by 1 and one-half inch long polypropylene fibers with the part number type FV1X0Z. These fibers have small amounts of antistatic or lubricating agent, but still function very well in the present invention.

As is well known in the textile industry, acrylic is a manufactured fiber in which the fiber-forming substance is any long chain synthetic polymer composed of at least 85 percent by weight of acrylonitrile units. Furthermore, modacrylic is a manufactured fiber in which the fiber-forming substance is any long chain synthetic polymer composed of less than 85 percent but at least 35 percent by weight of acrylonitrile units. The acrylic and modacrylic fibers used in the present invention fall within these ranges.

Modacrylic fibers used in the tests described herein were 2.0 denier by 2 inches long and sold under the trademark KANEKARON style SE, which is sold by the Kaneka Corporation, Osaka Japan. The fiber was cleaned by washing in a solution of about 4% sodium carbonate by weight in water. The fibers were then rinsed and dried. The acrylic fiber used in the tests is manufactured by Solutia, Inc., style A17879. This is a semi-dull fiber, 3.0 denier by 2 inches long. The fiber was cleaned by washing in a solution of approximately 4% sodium carbonate by weight in water. The fibers were then rinsed and dried.

The three types of fibers are preferably blended to form a non-woven web, although the fibers could be weaved or otherwise formed into a sheet, panel, batt or other structure. The web is preferably made by blending the fibers in a conventional manner and then carding so that the fibers rub together to impart an electrostatic charge that remains long after manufacture. Alternatively, the web could be blended and then a charge imparted by a corona or an electric field, or such a charge could be imparted prior to blending. It has been discovered that a web formed according to the present invention maintains an electrostatic charge for a significant period.

Samples of webs embodying the instant invention have been tested and the results are compiled in the table shown in FIG. 1. The tests were performed on a TSI 8130, a well-known machine for testing filtration characteristics of materials. The tests were performed under conditions of 90 liters per minute of air flow, with samples of approximately 6 inches wide by 6 inches long having a weight of approximately 8.0 grams. The resulting penetration of oil is measured at 15 minutes duration, and has been recorded in the table of FIG. 1. Because the results obtained are the percentage of the oil that penetrates the filtration material, the lower the penetration number, the better the filtration material performed. The rows in FIG. 1 are arranged in order of sample performance.

The standard polypropylene fiber used in the tests was manufactured by Filter Specialists Inc. It was a 2.8 denier by 2.0 inch natural polypropylene fiber manufactured with a standard finish used for polypropylene. It was scoured by washing in a solution of approximately 1% sodium carbonate by weight in water. The fibers were then rinsed and dried.

It should be noted that samples a and b have fiber types and compositions similar to the filtration material described in U.S. Pat. No. 4,798,850 to Brown. Furthermore, samples o, e and r have fiber types and compositions substantially similar to the filtration material described in U.S. Pat. No. 6,328,788 to Auger. Thus, the present invention's performance can be compared to the performance of the prior art.

Sample g, having a composition of 10% polymetaphenylene isophthalamide fibers, 50% Asota PP fibers and 40% modacrylic fibers performed superior to all other samples. The data also show that as the relative amount of polymetaphenylene isophthalamide is increased, the amount of modacrylic decreased and the amount of polypropylene remained constant, the performance appears to deteriorate very slightly relative to sample g, as exhibited by the slightly higher penetration rates of samples h and i.

It is notable that this result (decreased performance with increased polymetaphenylene isophthalamide content) is the opposite of the result obtained with the specimens made in accordance with the Auger patent. With samples o, p, q and r, increased polymetaphenylene isophthalamide content resulted in enhanced performance.

In addition, with the exception of sample c, all samples made in accordance with the present invention had better performance than all samples made in accordance with the Brown patent when the polymetaphenylene isophthalamide content in the filtration material embodying the present invention was held below 30%. It is not understood why sample c did not perform as well as sample g even though the only change in composition is the reversal of the percentages of polypropylene and modacrylic. However, even sample c is better than half of the samples that are similar to the Brown and Auger filters.

Of course, it is expected that other relative compositions of the same three types of fibers will result in acceptable penetration performance. For example, even if the polymetaphenylene isophthalamide is reduced to five or ten weight percent, and the remaining fibers are a mixture of the other two types of fibers, variations in penetration results are expected to be within an acceptable range. For a filtration material with polymetaphenylene isophthalamide fibers making up ten percent of the weight of a filter, the balance of the filter could be made of as little as 10 percent polypropylene and 80 percent modacrylic or acrylic, or as much as 80 percent polypropylene and 10 percent modacrylic or acrylic. Furthermore, the weight percentage polymetaphenylene isophthalamide could be increased to as much as 80 percent, with the balance being 10 percent polypropylene and 10 percent modacrylic or acrylic.

These compositions are expected to result in acceptable performance based on the performance of the tested compositions. Therefore, it has been discovered that a web or other structure formed into a filter has superior properties at preferred compositions, and acceptable properties at all compositions.

While certain preferred embodiments of the present invention have been disclosed in detail, it is to be understood that various modifications may be adopted without departing from the spirit of the invention or scope of the following claims.

What is claimed is:

1. A filter material comprising a blend of at least three types of fibers: (a) polypropylene fibers (b) polymetaphenylene isophthalamide fibers and (c) fibers of a third type selected from the group consisting of acrylic and modacrylic, wherein the blend contains at least about ten weight percent of each type of fiber, and wherein the blend contains about ten weight percent polymetaphenylene isophthalamide fibers, and the blend contains polypropylene fibers and the third type of fibers in a ratio between about 10:80 and about 80:10.

2. The filter material in accordance with claim 1, wherein the blend contains polypropylene fibers and the third type of fibers in a ratio between about 20:70 and about 70:20.

3. The filter material in accordance with claim 2, wherein the blend contains polypropylene fibers and the third type of fibers in a ratio between about 30:60 and about 60:30.

4. The filter material in accordance with claim 3, wherein the blend contains polypropylene fibers and the third type of fibers in a ratio between about 40:50 and about 50:40.

5. The filter material in accordance with claim 1, wherein the blend contains about twenty weight percent polymetaphenylene isophthalamide fibers, and the blend contains polypropylene fibers and the third type of fibers in a ratio between about 10:70 and about 70:10.

6. The filter material in accordance with claim 5, wherein the blend contains polypropylene fibers and the third type of fibers in a ratio between about 20:60 and about 60:20.

7. The filter material in accordance with claim 6, wherein the blend contains polypropylene fibers and the third type of fibers in a ratio between about 30:50 end about 50:30.

8. The filter material in accordance with claim 7, wherein the blend contains polypropylene fibers and the third type of fibers in a ratio of about 40:40.

9. The filter material in accordance with claim 1, wherein the blend contains about thirty weight percent polymetaphenylene isophthalamide fibers, and the blend contains polypropylene fibers and the third type of fibers in a ratio between about 10:60 and about 60:10.

10. The filter material in accordance with claim 9, wherein the blend contains polypropylene fibers and the third type of fibers in a ratio between about 20:50 and about 50:20.

11. The filter material in accordance with claim 10, wherein the blend contains polypropylene fibers and the third type of fibers in a ratio between about 30:40 and about 40:30.

12. The filter material in accordance with claim 1, wherein the blend contains about ten weight percent polymetaphenylene isophthalamide fibers, about 50 weight percent polypropylene fibers and about 40 weight percent modacrylic fibers.

13. The filter material in accordance with claim 1, wherein the blend contains about ten weight percent polymetaphenylene isophthalamide fibers, about 50 weight percent polypropylene fibers and about 40 weight percent acrylic fibers.

\* \* \* \* \*